(12) United States Patent
Kye et al.

(10) Patent No.: US 12,244,942 B2
(45) Date of Patent: Mar. 4, 2025

(54) DEPTH SENSOR AND IMAGE SIGNAL PROCESSOR FOR CHANGING BINNING MODE

(71) Applicant: SAMSUNG ELECTRONICS CO., LTD., Suwon-si (KR)

(72) Inventors: Myeonggyun Kye, Yongin-si (KR); Kyumin Kyung, Seoul (KR); Minsun Keel, Seoul (KR); Seungchul Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 17/720,883

(22) Filed: Apr. 14, 2022

(65) Prior Publication Data

US 2022/0345646 A1    Oct. 27, 2022

(30) Foreign Application Priority Data

Apr. 21, 2021  (KR) .......................... 10-2021-0051821
Jul. 26, 2021  (KR) .......................... 10-2021-0097963

(51) Int. Cl.
*H04N 25/42* (2023.01)
*G01B 11/22* (2006.01)
*H04N 25/46* (2023.01)
*H04N 25/50* (2023.01)
*H04N 25/705* (2023.01)
*H04N 25/75* (2023.01)
*H04N 25/772* (2023.01)

(52) U.S. Cl.
CPC ............. *H04N 25/42* (2023.01); *G01B 11/22* (2013.01); *H04N 25/46* (2023.01); *H04N 25/50* (2023.01); *H04N 25/705* (2023.01); *H04N 25/75* (2023.01); *H04N 25/772* (2023.01)

(58) Field of Classification Search
CPC ...... H04N 25/42; H04N 25/75; H04N 25/772; H04N 25/46; H04N 25/705; H04N 25/50; G01B 11/22
USPC ......................................................... 348/135
See application file for complete search history.

(56) References Cited

U.S. PATENT DOCUMENTS 9,784,822 B2 * 10/2017 Metz ..................... G01S 7/4911
9,786,252 B2    10/2017 Shin et al.
10,101,452 B2   10/2018 Ikeno et al.
10,602,073 B2   3/2020  Dielacher et al.
10,804,301 B2   10/2020 Tadmor et al.
(Continued)

FOREIGN PATENT DOCUMENTS

JP   2014-021100      2/2014
KR   10-2016-0092137  8/2016

*Primary Examiner* — Stuart D Bennett
(74) *Attorney, Agent, or Firm* — F. Chau & Associates, LLC

(57) ABSTRACT

A depth sensor for measuring a distance to an object and an image signal processor configured to change a binning mode based on ambient light are provided. A method for operating a depth sensor for measuring a distance to an object includes outputting a pixel signal from at least one depth pixel included in a pixel array, generating ambient light information based on an intensity of ambient light outside the depth sensor, the intensity of the ambient light being measured using the pixel signal, and setting a binning mode of the depth sensor to an analog binning mode or a digital binning mode based on the ambient light parameter value.

18 Claims, 17 Drawing Sheets

(56) References Cited

U.S. PATENT DOCUMENTS

| | | | |
|---|---|---|---|
| 10,923,515 B2 | 2/2021 | Tadmor et al. | |
| 11,323,640 B2 * | 5/2022 | Kim | H04N 25/447 |
| 2013/0327950 A1 * | 12/2013 | Niwa | G01T 1/17 |
| | | | 250/336.1 |
| 2013/0329075 A1 * | 12/2013 | Liang | H04N 23/815 |
| | | | 348/222.1 |
| 2016/0232691 A1 * | 8/2016 | Nishii | G06T 11/008 |
| 2017/0212228 A1 | 7/2017 | Van Nieuwenhove | |
| 2020/0184664 A1 | 6/2020 | Rhee et al. | |

\* cited by examiner

DEPTH SENSOR AND IMAGE SIGNAL PROCESSOR FOR CHANGING BINNING MODE

CROSS-REFERENCE TO RELATED APPLICATIONS

This application is based on and claims priority under 35 U.S.C. § 119 to Korean Patent Application Nos. 10-2021-0051821, filed on Apr. 21, 2021, and 10-2021-0097963, filed on Jul. 26, 2021, in the Korean Intellectual Property Office, the disclosures of which are incorporated by reference herein in their entirety.

TECHNICAL FIELD

The inventive concept relates to a depth sensor, and more particularly, to a depth sensor and an image signal processor for changing a binning mode.

DISCUSSION OF THE RELATED ART

Many applications call for depth information about objects and their surroundings. For example, depth information is frequently used in the biometrics and autonomous driving industries. To obtain this information, sensors such as three-dimensional (3D) cameras or laser detection and ranging (LADAR) technology may be used. For example, the distances and depth information may be determined by a time of flight (TOF) method which generates a depth image by measuring a distance between an imaging device and a subject by measuring a round trip time of light. The TOF method includes processing including projecting light of a certain wavelength to a subject and extracting an image by measuring or capturing an image of light reflected from the subject, by using a photodiode or a camera.

However, it is difficult to attain depth information and to generate depth images from objects that are far away. To increase accuracy of a measurement distance, a binning technique that combines a plurality of pieces of pixel information into one may be used. However, resolution may be reduced by the binning technique. The binning technique includes an analog binning method and a digital binning method. However, noise may be different among the analog and digital binning methods.

SUMMARY

The inventive concept provides a depth sensor and an image signal processor for changing a binning mode based on an intensity of ambient light.

According to an aspect of the inventive concept, an operating method of a depth sensor for measuring a distance to an object includes outputting a pixel signal from at least one depth pixel included in a pixel array, generating ambient light information from the pixel signal, wherein the ambient light information is based on an intensity of ambient light outside the depth sensor, and setting a binning mode of the depth sensor to an analog binning mode or a digital binning mode based on the ambient light parameter value.

According to another aspect of the inventive concept, a depth sensor includes a transmitter configured to transmit an incident signal to an object to measure a distance to the object and a receiver configured to receive a reflected signal reflected by the object, wherein the receiver includes a pixel array including a plurality of depth pixels configured to generate a pixel signal from the reflected signal, a read circuit configured to receive the pixel signal generated in the pixel array, and a controller configured to calculate an intensity of ambient light based on the pixel signal, and to set an analog binning mode or a digital binning mode of the read circuit based on the intensity of the ambient light, wherein the read circuit operates in the analog binning mode or the digital binning mode to generate a digital pixel signal based on the pixel signal.

According to another aspect of the inventive concept, a depth sensor for measuring a distance to an object includes: a controller configured to calculate an intensity of ambient light based on a pixel signal generated with respect to a reflected signal reflected by the object, and configured to determine whether an operation environment of the depth sensor is indoors or outdoors based on the intensity of the ambient light, and further configured to perform analog binning or digital binning on the pixel signal based on the determined operation environment.

According to another aspect of the inventive concept, a method of operating an image signal processor (ISP) includes receiving, from a depth sensor for measuring a distance to an object, a pixel signal generated with respect to a reflected signal reflected by the object, calculating an intensity of ambient light based on the pixel signal, and determining, based on the intensity of the ambient light, whether the depth sensor is to perform an analog binning operation or a digital binning operation.

According to another aspect of the inventive concept, an ISP includes a parameter calculation circuit configured to receive, from a depth sensor for measuring a distance to an object, a pixel signal generated with respect to a reflected signal reflected by the object, and calculate, based on the pixel signal, an ambient light parameter value in which an intensity of ambient light is reflected, and a binning mode determination circuit configured to determine a binning mode of the depth sensor, wherein when the ambient light parameter value exceeds a threshold, configuring the depth sensor to perform an analog binning operation, and when the ambient light parameter value is equal to or less than the threshold, configuring the depth sensor to perform a digital binning operation.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

In depth imaging systems that use binning techniques, resolution is sacrificed in order to achieve a greater signal to noise ratio. For example, one binning technique is to use a larger group of pixels, such as a 2×2 group of four pixels, as a single pixel that collects the phase shifted signal (the depth information). To do this, pixel signals may be added up and/or averaged. The binning operations may be applied to digital pixel signals or analog pixel signals. Specific examples of binning will be discussed in detail below. Digital binning and analog binning may provide different benefits, and one may be more ideal than the other based on environmental conditions.

Hereinafter, embodiments of the inventive concept will be described in detail with reference to the attached drawings.

Figure 1:
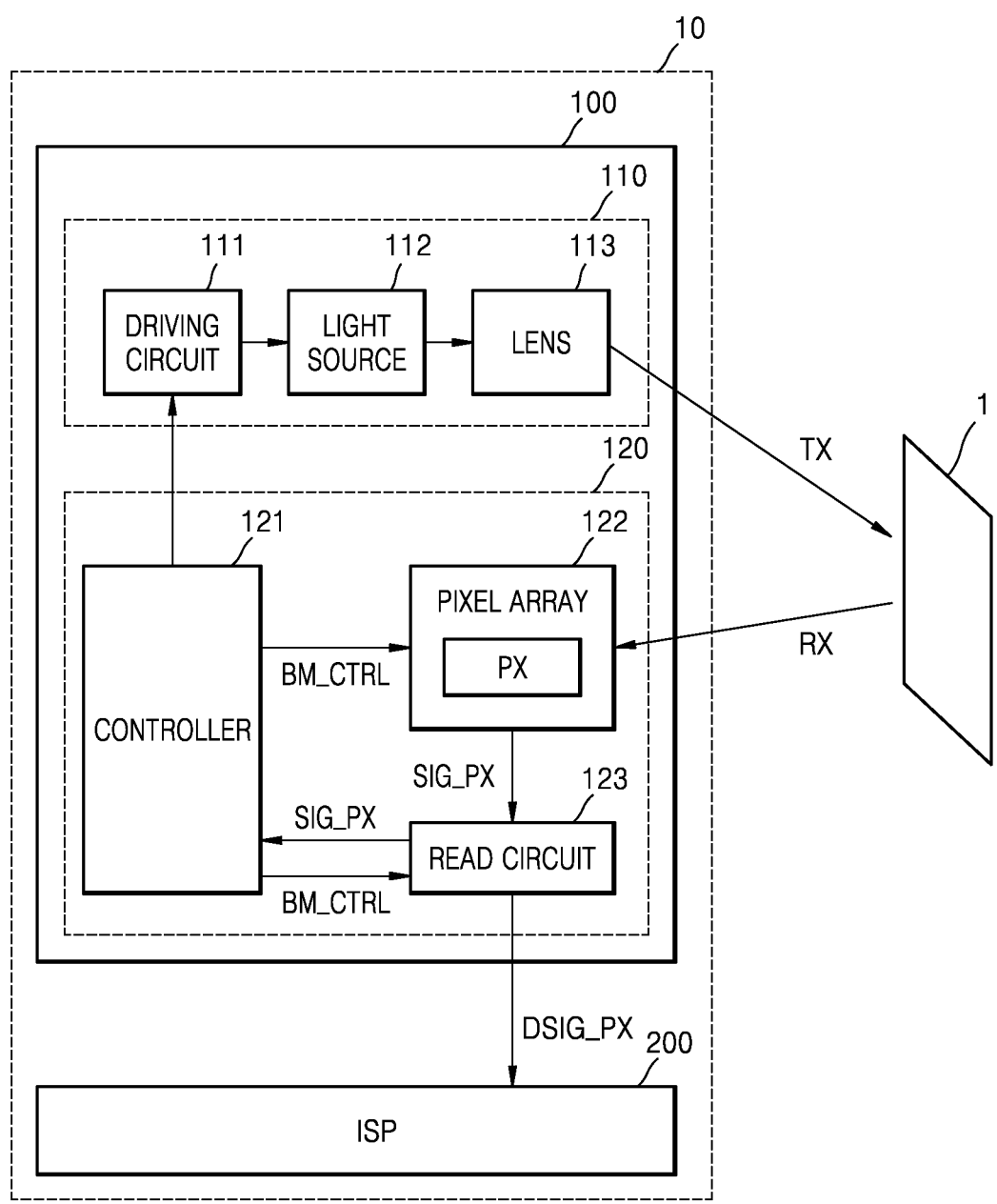
FIG. 1 is a block diagram of an image processing device according to an embodiment.
Figure 2:
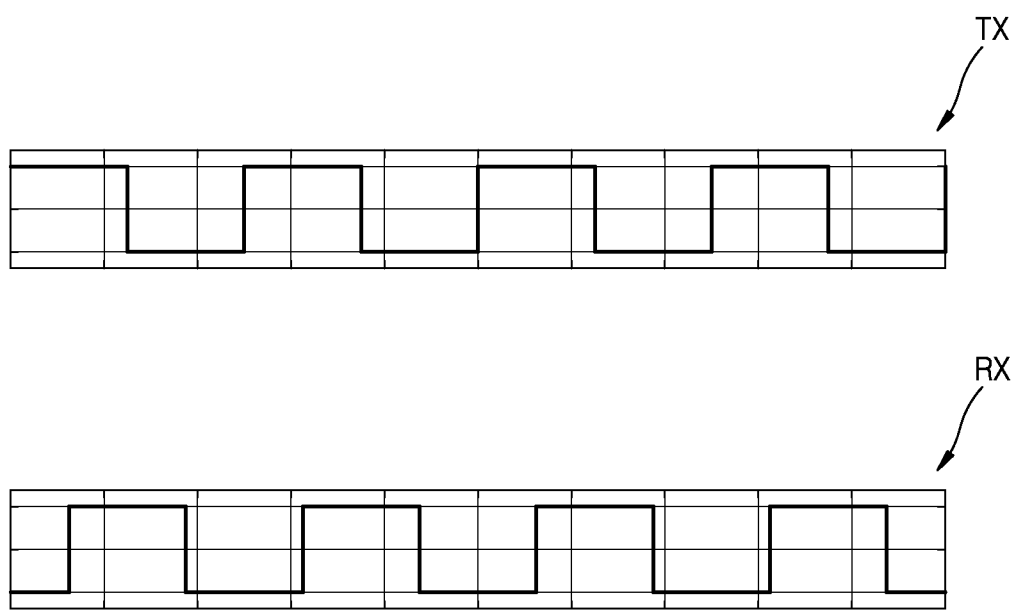
FIG. 2 is a timing diagram of an incident signal and a reflected signal according to an embodiment.

FIG. 1 is a block diagram of an image processing device according to an embodiment. FIG. 2 is a timing diagram of an incident signal and a reflected signal according to an embodiment.

Referring to FIGS. 1 and 2, an image processing device 10 may include a depth sensor 100 and an image signal processor (ISP) 200. The image processing device 10 may generate depth data by measuring a distance to an object 1 located outside of the image processing device 10.

The depth sensor 100 may operate in a time of flight (TOF) manner, and may measure a distance to the object 1 based on a phase difference between an incident signal TX and a reflected signal RX. To measure the distance to the object 1, the depth sensor 100 may include a transmitter 110 that transmits the incident signal TX to the object 1 and a receiver 120 which receives the reflected signal RX reflected by the object 1 and generates a digital pixel signal DSIG_PX based on the reflected signal RX. The transmitter 110 may include a driving circuit 111, a light source 112, and an optical system 113, and the receiver 120 may include a controller 121, a pixel array 122, and a read circuit 123.

The driving circuit 111 may generate a clock signal for driving the light source 112 based control operations from the controller 121. The light source 112 may generate a modulated optical signal in response to the clock signal and radiate the signal to the object 1 through the optical system 113. The clock signal or the modulated optical signal may be a sine wave or a square wave.

The light source 112 may include a light emitting diode (LED), an organic light emitting diode (OLED), an active-matrix organic light emitting diode (AMOLED), or a laser diode. In an embodiment, the light source 112 may be configured as a vertical-cavity surface-emitting laser (VCSEL).

The pixel array 122 may include at least one depth pixel PX that receives the reflected signal RX reflected from the object 1. The depth pixel PX may generate the pixel signal SIG_PX, which is an electrical signal, by accumulating photo-charges for a certain period of time, for example, an integration time.

The depth pixel PX may output at least one pixel signal SIG_PX according to control signals having different phases during one sampling period. For example, the depth pixel PX may have a 4-tap structure, and may output four pixel signals SIG_PX by photo-gate control signals having four different phases from each other. The depth pixel PX will be described in further detail later.

The pixel array 122 may receive a binning mode control signal BM_CTRL from the controller 121. According to the binning mode control signal BM_CTRL, the pixel array 122 may control the timing of the transmission of charges generated from the plurality of taps to a floating diffusion node. For example, the pixel array 122 may obtain a signal from a tap corresponding to a certain phase in one frame period as the pixel array 122 operates in a full mode. The pixel array 122 may obtain signals from a plurality of taps corresponding to a certain phase in one frame period as the pixel array 122 operates in a binning mode.

The read circuit 123 may generate a digital pixel signal DSIG_PX by processing the pixel signal SIG_PX output from the depth pixel PX. In an embodiment, the read circuit 123 may perform a correlated double sampling (CDS) operation and an analog to digital converting (ADC) operation on the pixel signal SIG_PX under control from the controller 121.

According to an embodiment of the inventive concept, the depth sensor 100 may perform a binning operation. Binning may refer to an operation of summing up and/or averaging a plurality of pixel signals SIG_PX. A binning operation performed on an analog signal may be referred to as analog binning, and a binning operation performed on a digital signal may be referred to as digital binning.

The pixel array 122 and/or the read circuit 123 may perform an analog binning operation or a digital binning operation according to the binning mode control signal BM_CTRL received from the controller 121.

In an embodiment, upon receiving a binning mode control signal BM_CTRL indicating an analog binning mode, the pixel array 122 may read charges generated from a plurality of taps, from one floating diffusion node. The plurality of taps may correspond to the same phase. Next, the read circuit 123 may generate the digital pixel signal DSIG_PX by summing up the signals obtained from the pixel array 122.

In an embodiment, upon receiving a binning mode control signal BM_CTRL indicating a digital binning mode, the pixel array 122 may read charges generated from one tap, from one floating diffusion node. The read circuit 123 may generate a digital pixel signal DSIG_PX by digitizing a signal obtained from the pixel array 122 and averaging a plurality of digital signals.

Accordingly, the pixel signals may be collected first and then digitized in the analog binning mode. The pixel signals may be digitized first and then added and averaged in the digital binning mode.

The number of signals subject to binning and/or the number of depth pixels PX subject to binning may be determined by the controller 121. The read circuit 123 may perform a binning operation on the pixel signal SIG_PX to generate the digital pixel signal DSIG_PX and provide the digital pixel signal DSIG_PX to the image signal processor 200.

The controller 121 may control a series of operations of the depth sensor 100. The controller 121 may control the driving circuit 111 to generate the incident signal TX. In an embodiment, the controller 121 may be configured to calculate an intensity of ambient light based on the pixel signal SIG_PX generated with respect to the reflected signal RX reflected from the object 1, and to determine whether the operating environment of the depth sensor 100 is indoors or outdoors based on the intensity of ambient light. The controller 121 may then set either analog binning or digital binning to be performed on the pixel signal SIG_PX based on the determined operating environment.

According to an embodiment of the inventive concept, the controller 121 may receive the pixel signal SIG_PX from the read circuit 123 and generate a binning mode control signal BM_CTRL to determine a binning mode of the read circuit 123 based on the pixel signal SIG_PX. The controller 121 may measure the intensity of ambient light by using the pixel signal SIG_PX. The controller 121 may generate ambient light information for determining a binning mode based on the intensity of ambient light. The binning mode of the read circuit 123 may be determined as an analog binning mode or a digital binning mode based on the ambient light information. Ambient light may also be referred to as peripheral light. Based on the ambient light information, it may be determined whether the operation environment of the depth sensor 100 is indoors or outdoors. The ambient light information may include, for example, an ambient light parameter of FIG. 8.

Since ambient light may act as a noise source with respect to the pixel signal SIG_PX, according to an embodiment of the inventive concept, to reduce noise, a binning mode may be changed according to the intensity of ambient light. Accordingly, noise of the pixel signal SIG_PX may be minimized, and thus, the accuracy of a measured distance or generated depth data may be increased.

The receiver 120 may further include a modulator for modulating the reflected signal RX, a row driver for supplying a control signal to the depth pixels PX, a row decoder, and a timing controller, and a photo-gate controller that provides a photo-gate control signal to the depth pixels PX.

The image signal processor 200 may generate depth data based on the digital pixel signal DSIG_PX. While the image signal processor 200 included inside the image processing device 10 is illustrated in FIG. 1, the inventive concept is not necessarily limited thereto, and the image signal processor 200 may also be implemented outside the image processing device 10.

Figure 3:
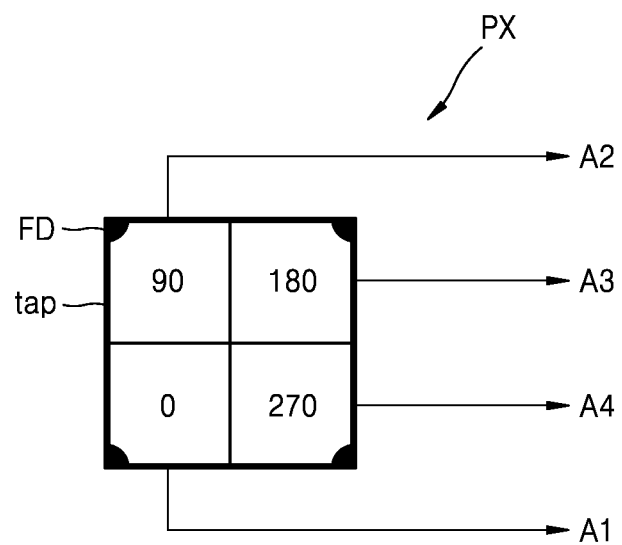
FIG. 3 illustrates an example of a structure of a depth pixel according to an embodiment.

FIG. 3 illustrates an example of a structure of a depth pixel according to an embodiment.

Referring to FIG. 3, a depth pixel PX may have a 4-tap structure. A 'tap' may refer to a component including a photo-gate and a detection region for collecting and detecting photo-charges according to a demodulation signal. For example, taps may allow imaging systems with many pixels to capture information more quickly, as multiple streams of data (e.g., accumulated charges) may be read at once.

The depth pixel PX may include four taps respectively corresponding to different phases from each other. For example, the four taps may correspond to phases of 0°, 90°, 180°, and 270°, respectively. That is, phases of a photo-gate signal provided to the four taps may be 0°, 90°, 180°, and 270°, respectively.

The depth pixel PX may include a floating diffusion node FD corresponding to each tap. In this example, as the depth pixel PX has a 4-tap structure, the depth pixel PX may include four floating diffusion nodes FD. Although the floating diffusion nodes FD are illustrated to be at each edge of each tap, the inventive concept is not necessarily limited thereto.

Four different pixel signals A1 to A4 may be generated from the respective taps due to charges accumulated in the floating diffusion nodes FD. In an embodiment, a first pixel signal A1 may be generated in a first tap corresponding to a phase of 0°, a second pixel signal A2 may be generated in a second tap corresponding to a phase of 90°, a third pixel signal A3 may be generated in a third tap corresponding to a phase of 180°, and a fourth pixel signal A4 may be generated in a fourth tap corresponding to a phase of 270°.

Based on the first to fourth pixel signals A1 to A4, a distance to the object 1 may be calculated according to Equations 1 and 2.

$$\varphi = \tan^{-1} \frac{A_2 - A_4}{A_1 - A_3} \quad \text{[Equation 1]}$$

$$d = \frac{c}{2f_m} \frac{\varphi}{2\pi} \quad \text{[Equation 2]}$$

In Equation 1, φ denotes a phase difference between the incident signal TX and the reflected signal RX, and in Equation 2, c denotes luminous flux, $f_m$ denotes a frequency of the incident signal TX or the reflected signal RX, and d denotes the distance to the object 1.

The depth pixel PX is not necessarily limited to the 4-tap structure, and may also have a 2-tap structure of a multi-tap structure including a plurality of taps.

Figure 4:
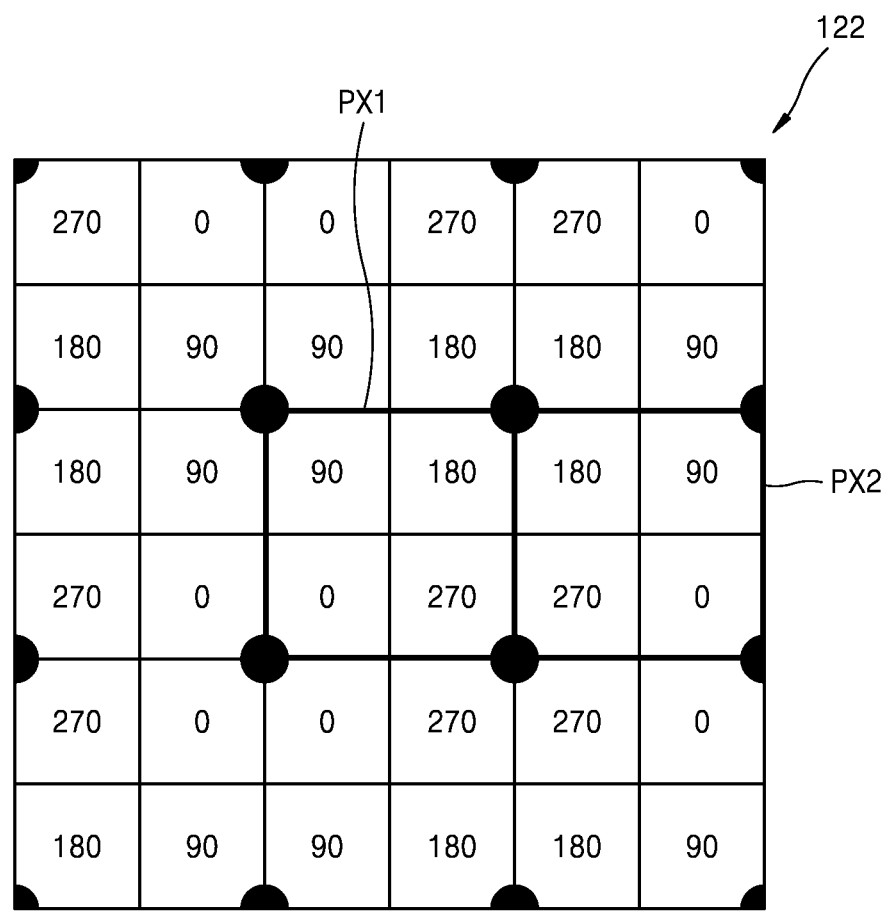
FIG. 4 illustrates an example of a structure of a pixel array according to an embodiment.

FIG. 4 illustrates an example of a structure of a pixel array 122 according to an embodiment. The pixel array 122 may correspond to an embodiment of the pixel array 122 of FIG. 1.

Referring to FIG. 4, the pixel array 122 may include a plurality of depth pixels each having a 4-tap structure. The pixel array 122 may include a first depth pixel PX1 and a second depth pixel PX2.

The first depth pixel PX1 may include first to fourth taps, and the second depth pixel PX2 may include fifth to eighth taps. The first tap and the fifth tap may correspond to the same phase, e.g., 0° phase, the second tap and the sixth tap may correspond to the same phase, e.g., 90° phase, the third tap and the seventh tap may correspond to the same phase, e.g., 180° phase, and the fourth and eighth taps may correspond to the same phase, e.g., 270° phase.

The first depth pixel PX1 and the second depth pixel PX2 may be arranged in a mirror-symmetrical structure such that taps corresponding to the same phase are next to each other. For example, the third tap and the seventh tap may be next to each other, and the fourth tap and the eighth tap may be next to each other. The first and second taps of the first depth pixel PX1 may be next to other depth pixels.

Accordingly, a plurality of taps that are next to each other may share a floating diffusion node. For example, the third tap and the seventh tap may share one floating diffusion node, and the fourth tap and the eighth tap may share one floating diffusion node.

Figure 5:
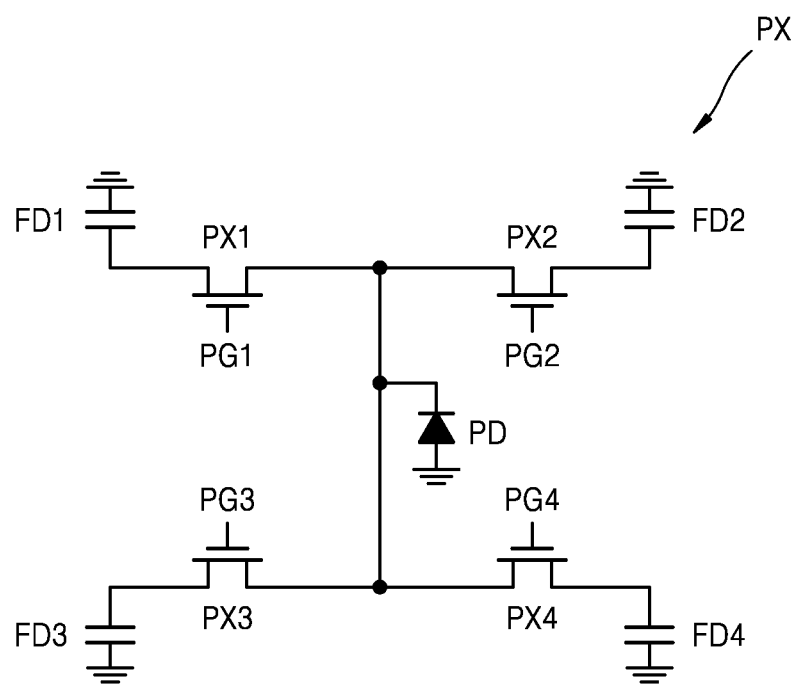
FIG. 5 is a schematic circuit diagram of a portion of a depth pixel according to an embodiment.
Figure 6:
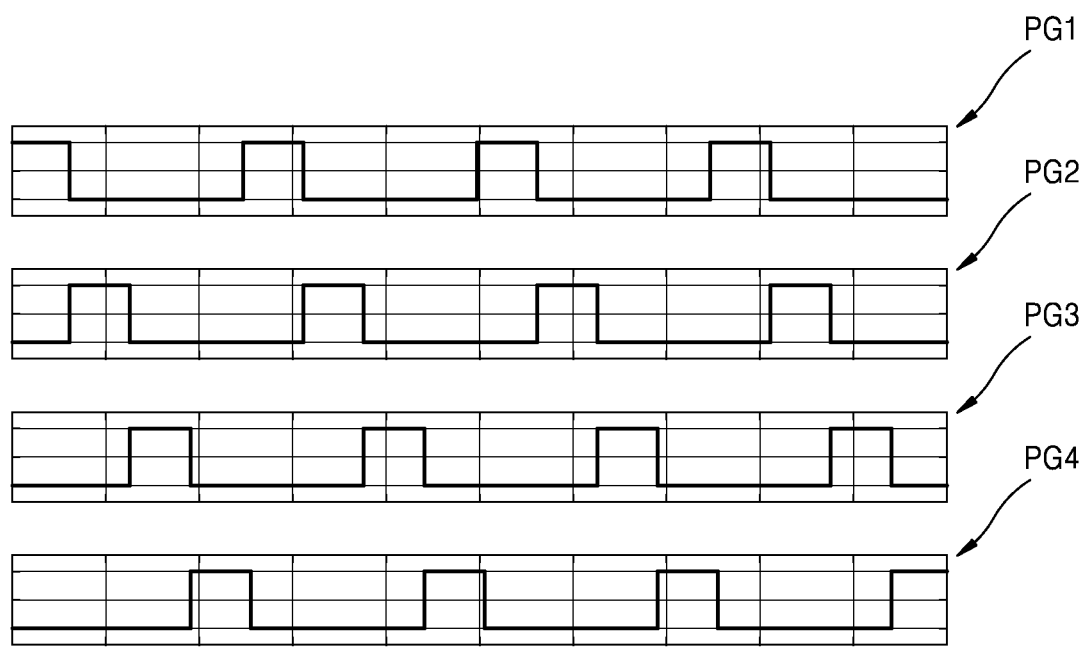
FIG. 6 is a timing diagram of a photo-gate signal according to an embodiment.

FIG. 5 is a circuit diagram of a portion of a depth pixel according to an embodiment. FIG. 6 is a timing diagram of photo-gate signal according to an embodiment.

Referring to FIG. 5, the depth pixel PX may include one photodiode PD, four photo-transistors PX1 to PX4, and four floating diffusion nodes FD1 to FD4. The depth pixel PX may further include at least one of four transfer transistors, four capture transistors, four storage transistors, and one overflow transistor.

The first to fourth photo-transistors PX1 to PX4 may be respectively connected between the first to fourth floating diffusion nodes FD1 to FD4 and to the photodiode PD. The first to fourth photo-transistors PX1 to PX4 may be controlled by first to fourth photo-gate signals PG1 to PG4, respectively. The first to fourth photo-gate signals PG1 to PG4 may have different phases from each other. In an embodiment, referring to FIG. 6, when assuming that a phase of the first photo-gate signal PG1 is 0°, phases of the second to fourth photo-gate signals PG2 to PG4 may be 90°, 180°, and 270°, respectively. That is, phase differences between the first to fourth photo-gate signals PG1 to PG4 may be 90°, respectively.

As the first to fourth phototransistors PX1 to PX4 are turned on, photo-charges may be generated in the photodiode PD, and the generated photo-charges may be accumulated in the first to fourth floating diffusion nodes FD1 to FD4. First to fourth pixel signals (e.g., A1 to A4 of FIG. 3) may be output based on the photo-charges accumulated in the first to fourth floating diffusion nodes FD1 to FD4. The first to fourth pixel signals A1 to A4 may also be different from each other due to, for example, a phase difference between the first to fourth photo-gate signals PG1 to PG4.

Figure 7:
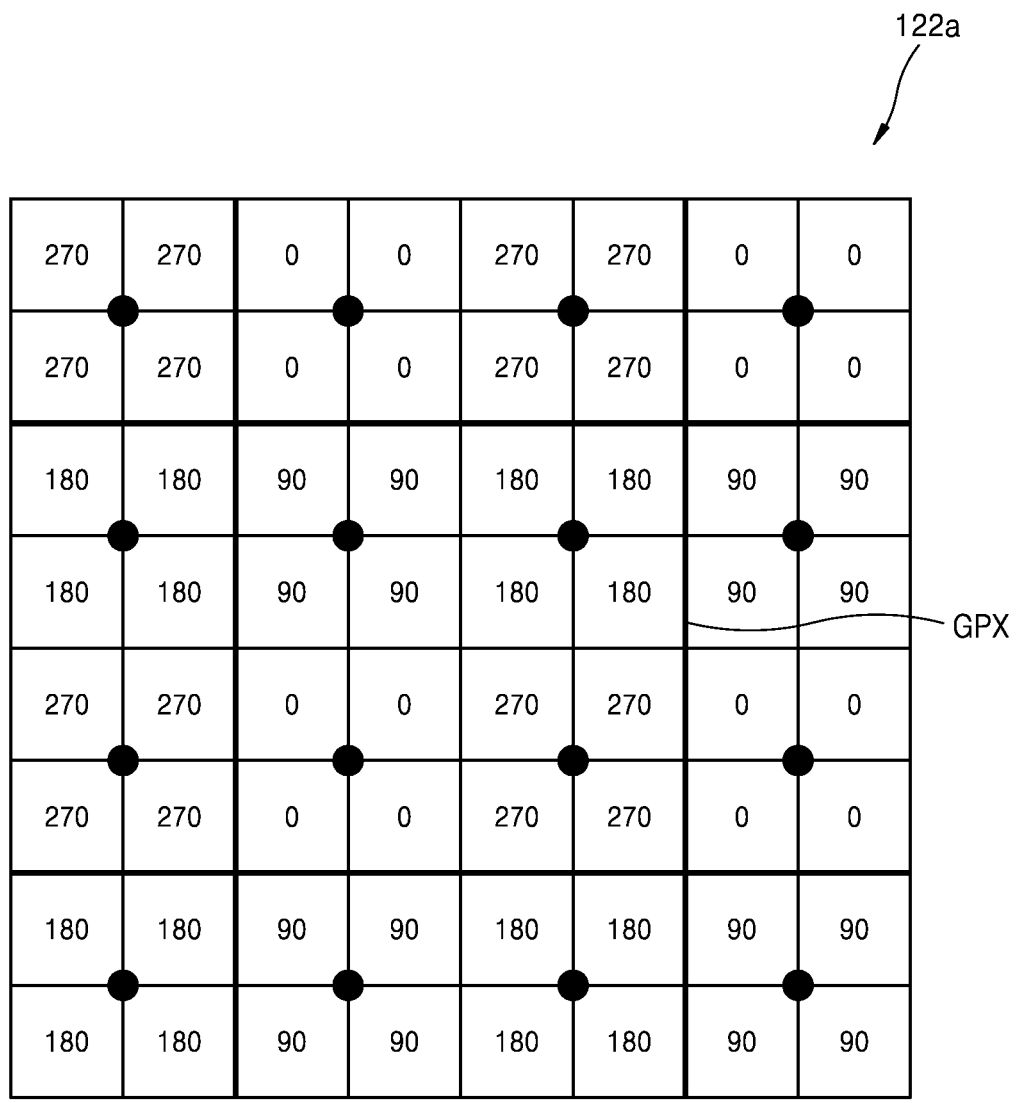
FIG. 7 illustrates an example of a structure of a pixel array according to an embodiment.

FIG. 7 illustrates an example of a structure of a pixel array according to an embodiment;

Referring to FIG. 7, a depth sensor (for example, 100 of FIG. 1) may operate in a binning mode, and accordingly, a pixel array 122a may operate in units of depth pixel groups (GPX). Hereinafter, a 2×2 binning mode will be described as an example.

A depth pixel group GPX may include a plurality of taps corresponding to the same phase. In an embodiment, first taps corresponding to a first phase (e.g., 0°), second taps corresponding to a second phase (e.g., 90°), third taps corresponding to a third phase (e.g., 180°), and fourth taps corresponding to a fourth phase (e.g., 270°) may be included, that is, four of each tap may be included.

Taps corresponding to the same phase may share a floating diffusion node. Accordingly, a pixel group signal generated from a plurality of taps (e.g., four first taps) may be output through one floating diffusion node.

Figure 8:
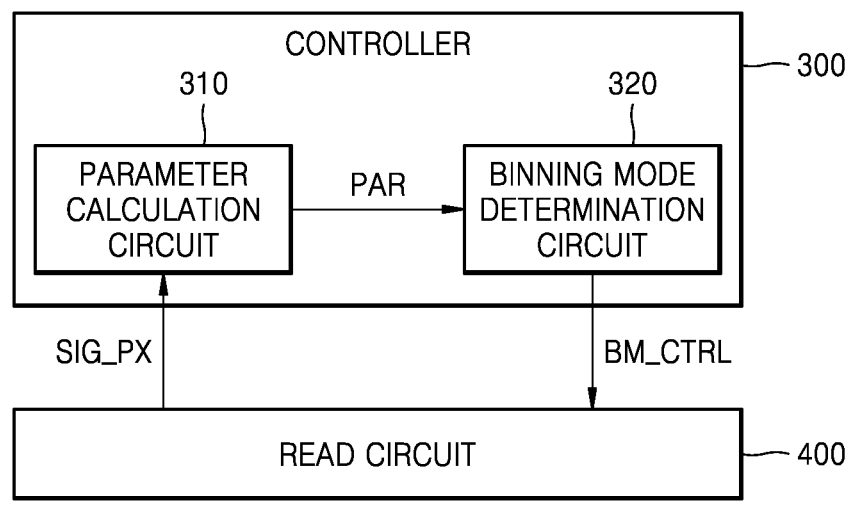
FIG. 8 is a block diagram of a controller according to an embodiment.
Figure 9:
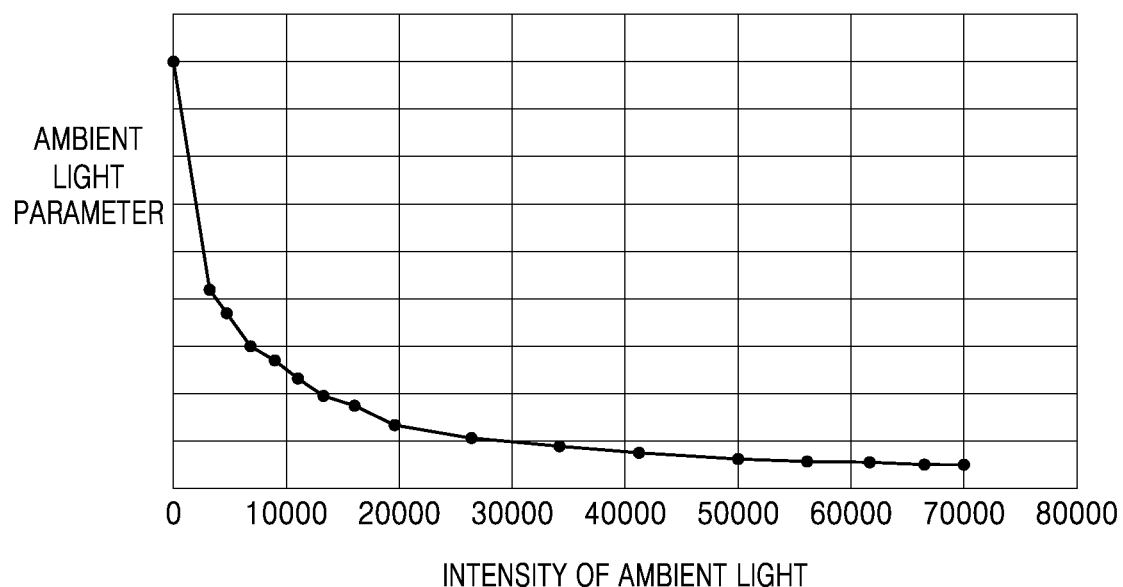
FIG. 9 is a graph that illustrates a relationship between an ambient light parameter and intensity of ambient light, according to an embodiment.
Figure 10:
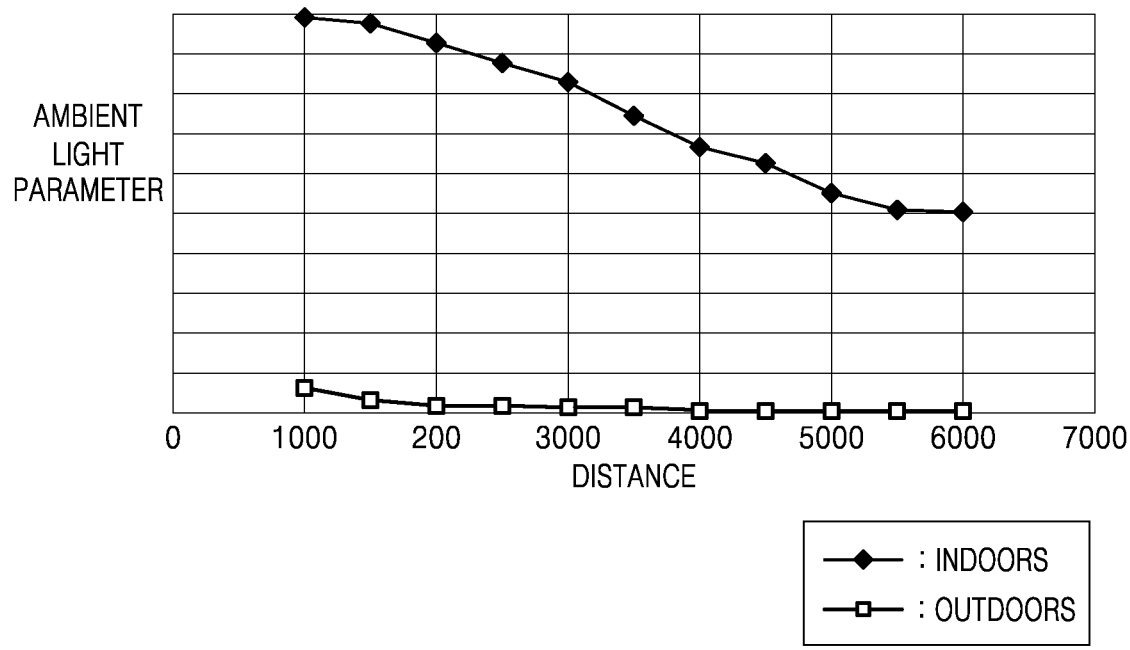
FIG. 10 is a graph that illustrates an ambient light parameter according to an operation environment of a depth sensor, according to an embodiment.
Figure 11:
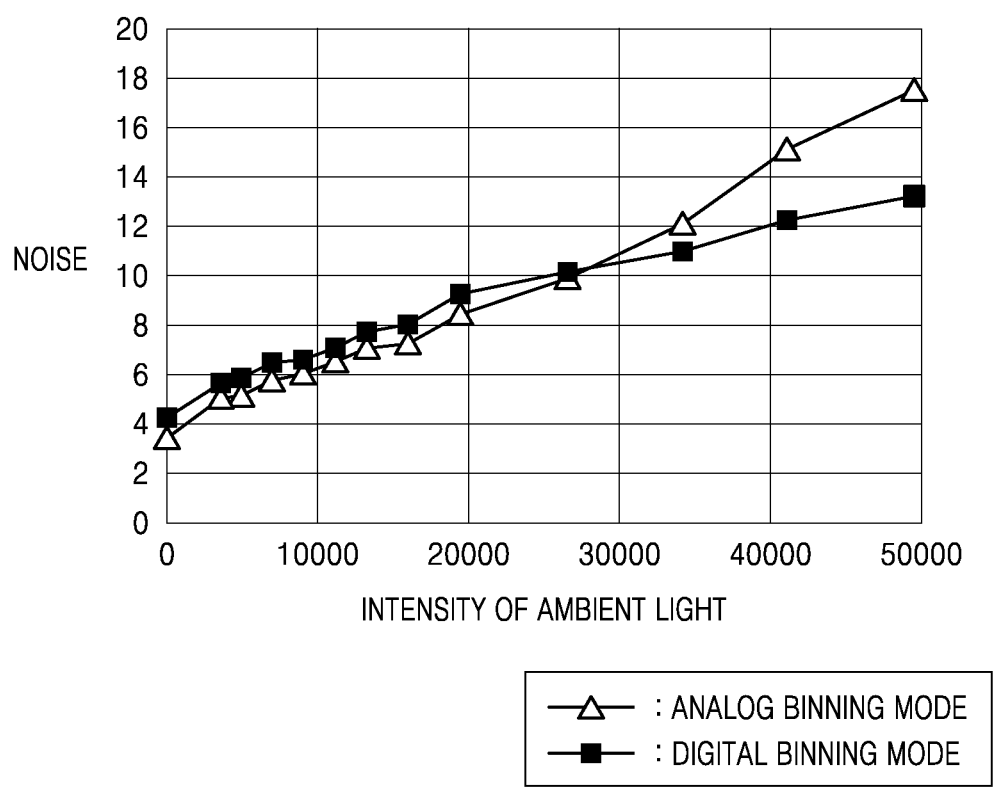
FIG. 11 is a graph that illustrates noise according to a binning mode of a depth sensor, according to an embodiment.

FIG. 8 is a block diagram of a controller according to an embodiment. FIG. 9 is a graph that illustrates a relationship between an ambient light parameter and an intensity of ambient light, according to an embodiment. FIG. 10 is a graph that illustrates an ambient light parameter according to an operation environment of a depth sensor, according to an embodiment. FIG. 11 is a graph that illustrates noise according to a binning mode of a depth sensor, according to an embodiment.

Referring to FIG. 8, a controller 300 may include a parameter calculation circuit 310 and a binning mode determination circuit 320.

The parameter calculation circuit 310 may receive a pixel signal SIG_PX from a read circuit 400. The pixel signal SIG_PX may be, for example, the first to fourth pixel signals A1 to A4 of FIG. 3. The parameter calculation circuit 310 may calculate an intensity of ambient light by using the pixel signal SIG_PX, and may calculate an ambient light parameter based on the intensity of ambient light. The ambient light parameter may refer to a variable in which an effect due to the distance to the object 1 is corrected in the intensity of ambient light. For example, the ambient light parameter may be a value that allows correction of a distance calculation based on the intensity of ambient light. Referring to FIG. 9, the ambient light parameter may be inversely proportional to the intensity of ambient light. An ambient light parameter value PAR may be calculated based on an intensity of the incident signal TX emitted to the object 1 and the intensity of ambient light. For example, the ambient light parameter value PAR may include a value obtained by dividing the intensity of the incident signal TX by the intensity of ambient light, but is not necessarily limited thereto. For example, the ambient light parameter value PAR may include a value obtained by dividing the intensity of the incident signal TX by the square root of the intensity of ambient light.

The intensity of the incident signal TX, the intensity of ambient light, and the ambient light parameter may be calculated through Equations 3, 4, and 5, respectively.

$$A = \frac{\sqrt{(A1 - A3)^2 + (A2 - A4)^2}}{2} \quad \text{[Equation 3]}$$

$$B = \frac{A1 + A2 + A3 + A4}{4} \quad \text{[Equation 4]}$$

$$P = \frac{A}{B} \quad \text{[Equation 5]}$$

In Equation 3, A1 to A4 denote first to fourth pixel signals output through the first to fourth taps of the depth pixel, respectively, and A denotes the intensity of the incident signal TX. In Equation 4, B denotes the intensity of ambient light, and in Equation 5, P denotes the ambient light parameter. The intensity of ambient light, B, may be calculated using the first to fourth pixel signals A1 to A4 before the incident signal TX is transmitted. For example, B may be calculated first, then A, then the ambient light parameter P. The parameter calculation circuit 310 may measure the intensity of ambient light regardless of the distance to the object 1 by using the ambient light parameter.

The binning mode determination circuit 320 may determine a binning mode of the read circuit 400 based on the ambient light parameter value PAR. For example, when the ambient light parameter value PAR exceeds a threshold, the binning mode may be determined as an analog binning mode, and when the ambient light parameter value PAR is less than or equal to the threshold, the binning mode may be determined as a digital binning mode. For example, when there is a relatively low amount of ambient light, the ambient light parameter value PAR may be higher, and the binning mode may be set to an analog binning mode. When there is a relatively high amount of ambient light, the ambient light parameter value PAR may be low, and the binning mode may be set to a digital binning mode. The binning mode determination circuit 320 may use two thresholds. This will be described below with reference to FIG. 15.

The binning mode determination circuit 320 may determine an operation environment of the depth sensor (e.g., 100 in FIG. 1) based on the ambient light parameter value PAR, and generate a binning mode control signal BM_CTRL to determine a binning mode of the read circuit 400 according to the operation environment. For example, when the ambient light parameter value PAR exceeds a threshold, the operation environment of the depth sensor 100 may be determined to be indoors, and when the ambient light parameter value PAR is less than or equal to the threshold, the depth sensor 100 may be determined to be outdoors.

Referring to FIG. 10, the ambient light parameter value PAR is clearly distinguished from the indoor environment and the outdoor environment despite a change in the distance to the object 1. Accordingly, the ambient light parameter may be used to reliably determine the operation environment of the depth sensor 100.

According to an embodiment of the inventive concept, as the controller 300 determines the binning mode of the read circuit 400 based on the ambient light parameter, a level of the pixel signal SIG_PX may be increased through analog binning in an indoor environment with a weak ambient light intensity. In stronger ambient light intensity, saturations of depth pixels due to the ambient light may be prevented through digital binning in, for example, an outdoor environment.

Referring to FIG. 11, according to the intensity of ambient light, noise of data generated through analog binning may be different from noise of data generated through digital binning. For example, when the intensity of ambient light is from about 0 lux to about 26 klux, noise of data generated through digital binning may be greater than noise of data generated through analog binning. Thus, it may be advantageous to perform analog binning in the above range. Also, when the intensity of ambient light exceeds 26 klux, noise of data generated through analog binning may be greater than noise of data generated through digital binning. Thus, it may be advantageous to perform digital binning in the above range.

When the intensity of ambient light is less than or equal to a preset threshold, noise may be reduced by performing analog binning, and when the intensity of ambient light exceeds the preset threshold, noise may be reduced by performing digital binning. In an embodiment, the binning mode determination circuit 320 may set a threshold of an ambient light parameter based on an intensity of ambient light in which a noise level is reversed, and determine an analog binning mode or a digital binning mode of the depth sensor 100 based on the threshold.

In FIG. 8, the parameter calculation circuit 310 may further receive a pixel group signal generated from a depth pixel group (e.g., GPX of FIG. 7). In this case, the parameter calculation circuit 310 may calculate the ambient light parameter value PAR based on the pixel group signal.

Figure 12:
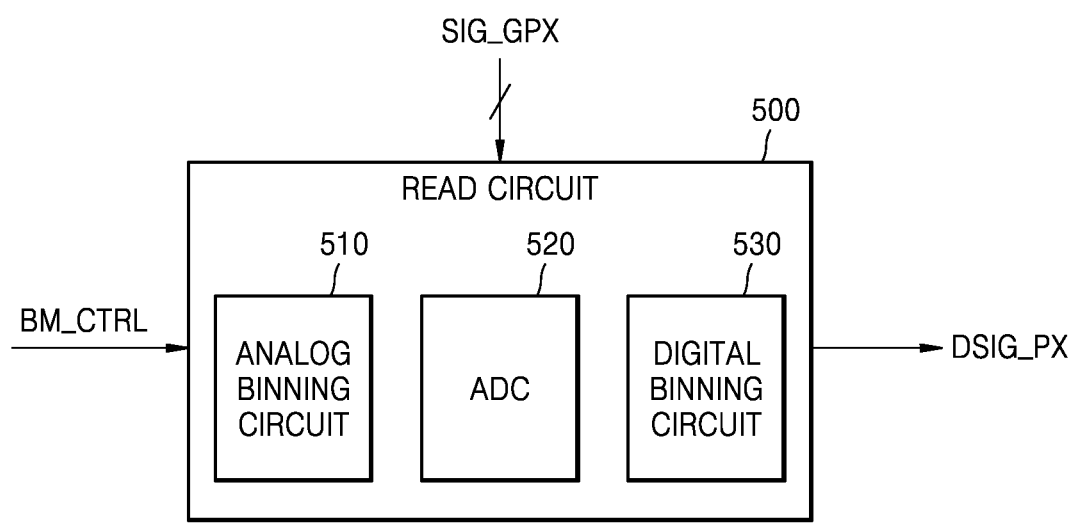
FIG. 12 is a block diagram of a read circuit according to an embodiment.

FIG. 12 is a block diagram of a read circuit 500 according to an embodiment.

Referring to FIG. 12, the read circuit 500 may receive a binning mode control signal BM_CTRL from a controller (e.g., 300 in FIG. 8), and may receive a plurality of pixel group signals from a pixel array (e.g., 122 in FIG. 1). The read circuit 500 may generate and output the digital pixel signal DSIG_PX by performing analog binning or digital binning according to the binning mode control signal BM_CTRL.

The read circuit 500 may include an analog binning circuit 510, an analog to digital converter (ADC) 520, and a digital binning circuit 530. In an embodiment, when analog binning is set because the binning mode control signal BM_CTRL is at a first logic level, the analog binning circuit 510 and the ADC 520 of the read circuit 500 may operate. In an embodiment, when digital binning is set because the binning mode control signal BM_CTRL is at a second logic level, the ADC 520 and the digital binning circuit 530 of the read circuit 500 may operate.

In an example analog binning operation, the analog binning circuit 510 may receive a plurality of pixel group signals, which are analog signals, and may generate a first signal by summing up each pixel group signal. The ADC 520 may generate a third signal by converting the first signal or a second signal, which is an analog signal, into a digital signal. The read circuit 500 may output the third signal as the digital pixel signal DSIG_PX.

In an example digital binning operation, the ADC 520 may receive a plurality of pixel group signals, which are analog signals, and convert each pixel group signal into a digital signal to generate a plurality of fourth signals. The digital binning circuit 530 may receive a plurality of fourth signals that are digital signals, and may generate a fifth signal by summing up the plurality of fourth signals. In an embodiment, the digital binning circuit 530 may generate a sixth signal by calculating an average value of the plurality of fourth signals. The read circuit 500 may output the fifth signal or the sixth signal as the digital pixel signal DSIG_PX.

Figure 13:
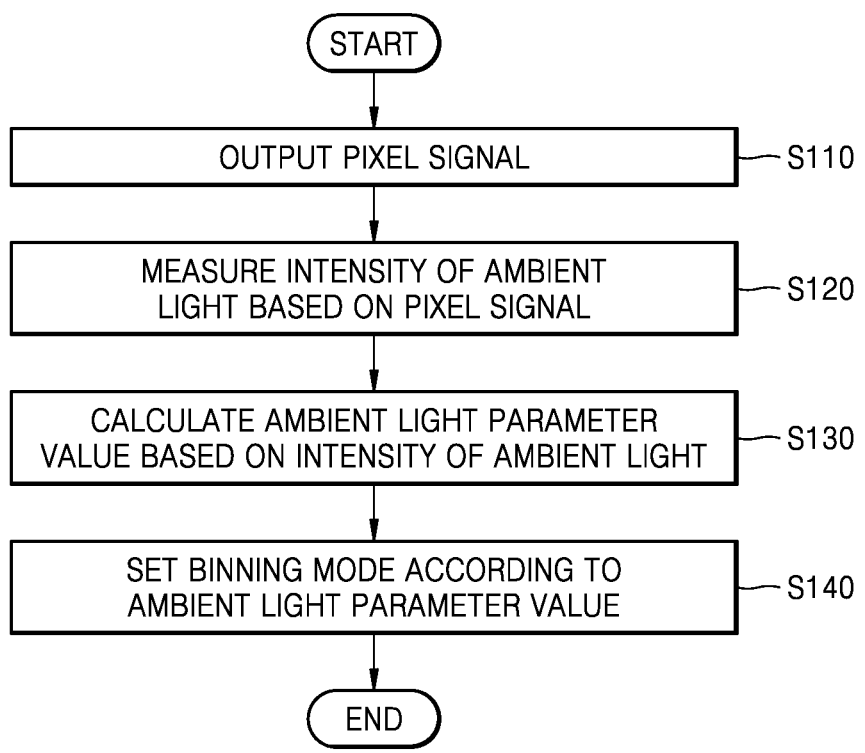
FIG. 13 is a flowchart of an operation of a depth sensor according to an embodiment.

FIG. 13 is a flowchart of an operation of a depth sensor according to an embodiment.

Referring to FIGS. 1 and 13 together, the pixel signal SIG_PX may be output (S110). In an embodiment, a plurality of pixel signals may be output from the depth pixel PX. In an embodiment, a plurality of pixel group signals may be output from a depth pixel group (e.g., GPX of FIG. 7).

The intensity of ambient light may be measured based on the pixel signal SIG_PX (S120). In an embodiment, the intensity of ambient light may be calculated by averaging a plurality of pixel signals. In an embodiment, the intensity of ambient light may be calculated by averaging a plurality of pixel group signals.

An ambient light parameter value PAR may be calculated based on the intensity of ambient light (S130). In an embodiment, the ambient light parameter value PAR may be calculated based on the intensity of ambient light and the intensity of the incident signal TX emitted to the object 1. For example, the ambient light parameter value PAR may be calculated based on a ratio between the intensity of the incident signal TX to the intensity of ambient light. The ambient light parameter value PAR may be inversely proportional to the intensity of ambient light.

A binning mode may be set according to the ambient light parameter value PAR (S140). In an embodiment, the operation environment of the depth sensor 100 may be determined through the ambient light parameter value PAR, and a binning mode of the depth sensor 100 may be set according to the operation environment.

Next, according to the set binning mode, a pixel group signal may be output from a depth pixel group including a plurality of depth pixels, and a digital pixel signal may be generated by processing the pixel group signal. In an example, when an analog binning mode is set, a first pixel group signal and a second pixel group signal may be summed up, and the combined signal may be converted into a digital pixel signal. In an example, when a digital binning mode is set, each of the first and second pixel group signals may first be converted into a digital signal, and each digital signal may be summed up to generate a digital pixel signal.

Figure 14:
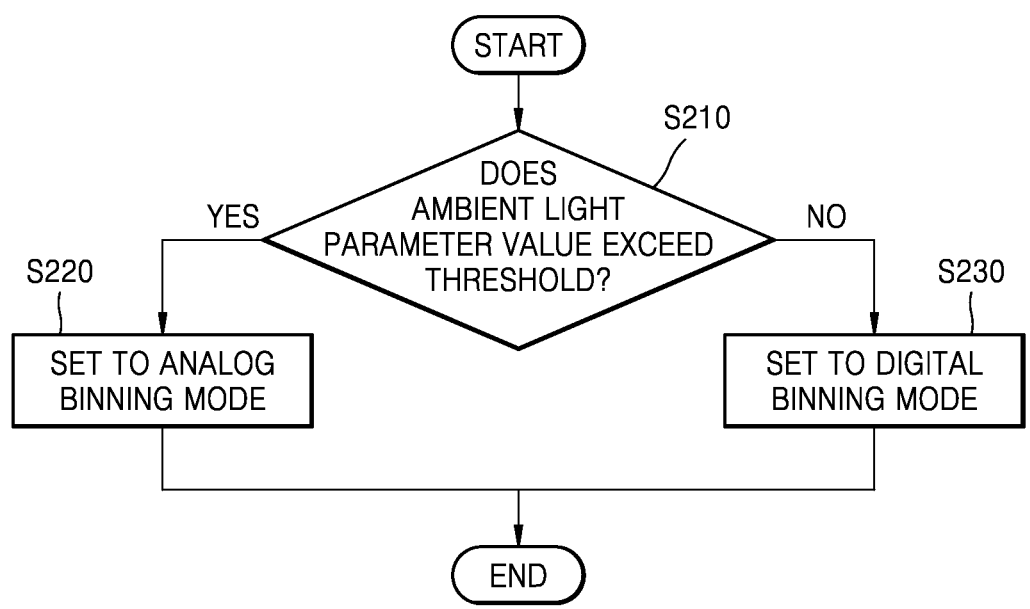
FIG. 14 is a flowchart of a method of setting a binning mode of a depth sensor, according to an embodiment.

FIG. 14 is a flowchart of a method of setting a binning mode of a depth sensor, according to an embodiment.

Referring to FIGS. 1 and 14 together, whether an ambient light parameter value PAR exceeds a preset threshold may be determined (S210). When the ambient light parameter value PAR exceeds (or is equal to or greater than) a threshold, the depth sensor 100 may set to an analog binning mode (S220). For example, the analog binning mode may be better suited to low light environments, such as indoor environments. When the ambient light parameter value PAR is equal to or less than (or is less than) the threshold, the depth sensor 100 may set to a digital binning mode (S230). For example, the digital binning mode may be better suited to relatively high ambient light environments, such as outdoor environments.

A plurality of thresholds may be used to change a binning mode of the depth sensor 100. This will be described with reference to FIG. 15.

Figure 15:
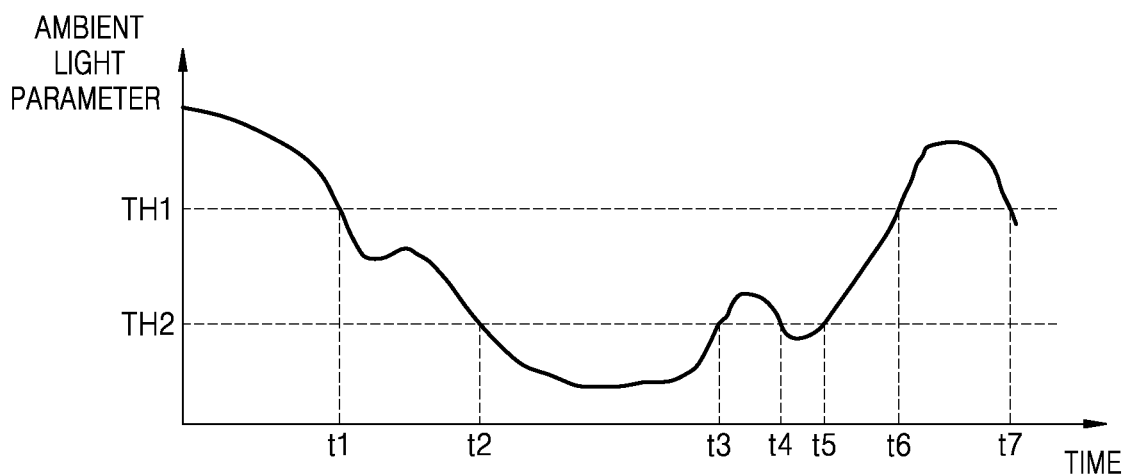
FIG. 15 is a graph that illustrates a method of setting a binning mode of a depth sensor, according to an embodiment.

FIG. 15 is a graph that illustrates a method of setting a binning mode of a depth sensor, according to an embodiment;

Referring to FIGS. 1 and 15 together, to change the binning mode of the depth sensor 100, a first threshold TH1 and a second threshold TH2, which is less than the first threshold TH1, may be used.

A case in which the ambient light parameter value PAR exceeds the first threshold TH1 will now be described, for example, before time t1 in FIG. 15. As an ambient light parameter may be inversely proportional to an intensity of ambient light, a relatively large ambient light parameter may indicate that the intensity of ambient light is relatively weak. Thus, an operation environment of the depth sensor 100 may be determined to be indoors. Accordingly, the depth sensor 100 may reduce noise by performing analog binning. Accordingly, quantization noise that may occur in the ADC (for example, 520 of FIG. 12) of the read circuit 123 may be reduced.

A case in which the ambient light parameter value PAR is equal to or less than the second threshold TH2 will now be described, for example, between time t2 and time t3 in FIG. 15. As an ambient light parameter may be inversely proportional to an intensity of ambient light, a relatively low ambient light parameter may indicate that the intensity of ambient light is relatively strong. Thus, an operation environment of the depth sensor 100 may be determined to be outdoors. Accordingly, the depth sensor 100 may reduce noise by performing digital binning. For example, by ensuring a full well capacity (FWC) of a floating diffusion node of the depth pixel PX in the digital binning operation, saturation of the depth pixel PX may be prevented.

A case in which the ambient light parameter value PAR exceeds the second threshold TH2 and is equal to or less than the first threshold TH1 will now be described. Here, a threshold used as a reference may vary according to whether the ambient light parameter value PAR is in an increasing trend or a decreasing trend.

For example, when the ambient light parameter value PAR is in a decreasing trend between a first time t1 and a second time t2, the second threshold TH2 (or the first threshold TH1) may be used as a reference value. Accordingly, at the second time t2, the binning mode of the depth sensor 100 may be changed from an analog binning mode to a digital binning mode.

For example, when the ambient light parameter value PAR is in an increasing trend between a third time t3 and a fourth time t4 and between a fifth time t5 and a sixth time t6, the first threshold TH1 (or the second threshold TH2) may be used as a reference value. Accordingly, the binning mode of the depth sensor 100 may be maintained as the digital binning mode between the third time t3 and the fourth time t4. In this case, the binning mode of the depth sensor 100 may not be changed between the fourth time t4 and the fifth time t5. As the first threshold TH1 is a reference value between the fifth time t5 and the sixth time t6, at the sixth time t6, the binning mode of the depth sensor 100 may be changed from the digital binning mode to the analog binning mode. The number of thresholds or a threshold used as a reference point for changing a binning mode are not necessarily limited thereto.

According to the embodiment of the inventive concept, the depth sensor 100 uses two different thresholds (TH1, TH2), and thus, the binning mode may be prevented from sensitively changing. For example, by using these two thresholds, the binning mode may not waver between analog binning and digital binning rapidly during operation. That is, even when the ambient light parameter value PAR instantaneously changes frequently, a binning mode changing operation may be performed stably.

Figure 16:
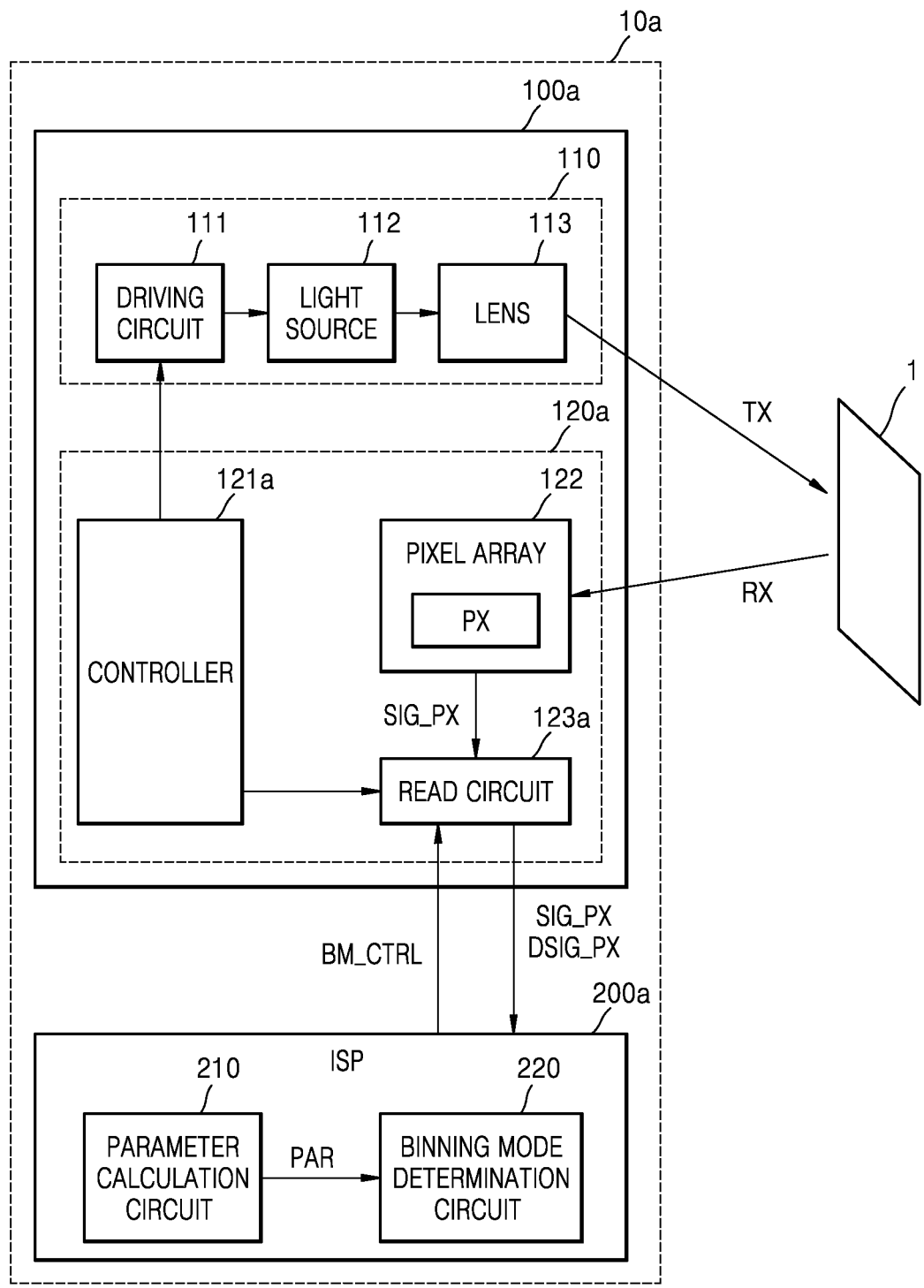
FIG. 16 is a block diagram of an image processing device according to an embodiment.

FIG. 16 is a block diagram of an image processing device 10*a* according to an embodiment. The image processing device 10*a* is similar to the image processing device 10 of FIG. 1, and thus, to the extent any description is omitted, it will be appreciated that description of similar components will be found earlier in the specification.

Referring to FIG. 16, an image signal processor 200*a* may perform a series of operations of determining a binning mode of a depth sensor 100*a*. In an embodiment, the image signal processor 200*a* may receive a pixel signal SIG_PX generated with respect to a reflected signal RX reflected by an object 1, from the depth sensor 100*a*, which measures a distance to the object 1. The image signal processor 200*a* may calculate an intensity of ambient light based on the pixel signal SIG_PX. The image signal processor 200*a* may determine, based on the intensity of ambient light, whether the depth sensor 100*a* is to perform an analog binning operation or a digital binning operation.

For example, the image signal processor 200*a* may determine whether the operation environment of the depth sensor 100*a* is indoors or outdoors, based on the intensity of ambient light. When the operation environment of the depth sensor 100*a* is determined to be indoors, it may be set to perform an analog binning operation, and when the operation environment of the depth sensor 100*a* is determined to be outdoors, it may be set to perform a digital binning operation.

The image signal processor 200*a* may include a parameter calculation circuit 210 and a binning mode determination circuit 220.

The parameter calculation circuit 210 may be similar to the parameter calculation circuit 310 of FIG. 8, and may receive the pixel signal SIG_PX from the depth sensor 100*a*, and calculate an ambient light parameter value PAR based on the pixel signal SIG_PX.

The binning mode determination circuit 220 may be similar to the binning mode determination circuit 320 of FIG. 8, and generate a binning mode control signal BM_CTRL for determining a binning mode of the depth sensor 100*a* based on the ambient light parameter value PAR and a preset threshold and provide the binning mode control signal BM_CTRL to the read circuit 123*a* of the depth sensor 100*a*.

The read circuit 123*a* may generate the digital pixel signal DSIG_PX by performing a binning operation based on the binning mode control signal BM_CTRL. The image signal processor 200*a* may receive the digital pixel signal DSIG_PX and generate depth data.

Figure 17:
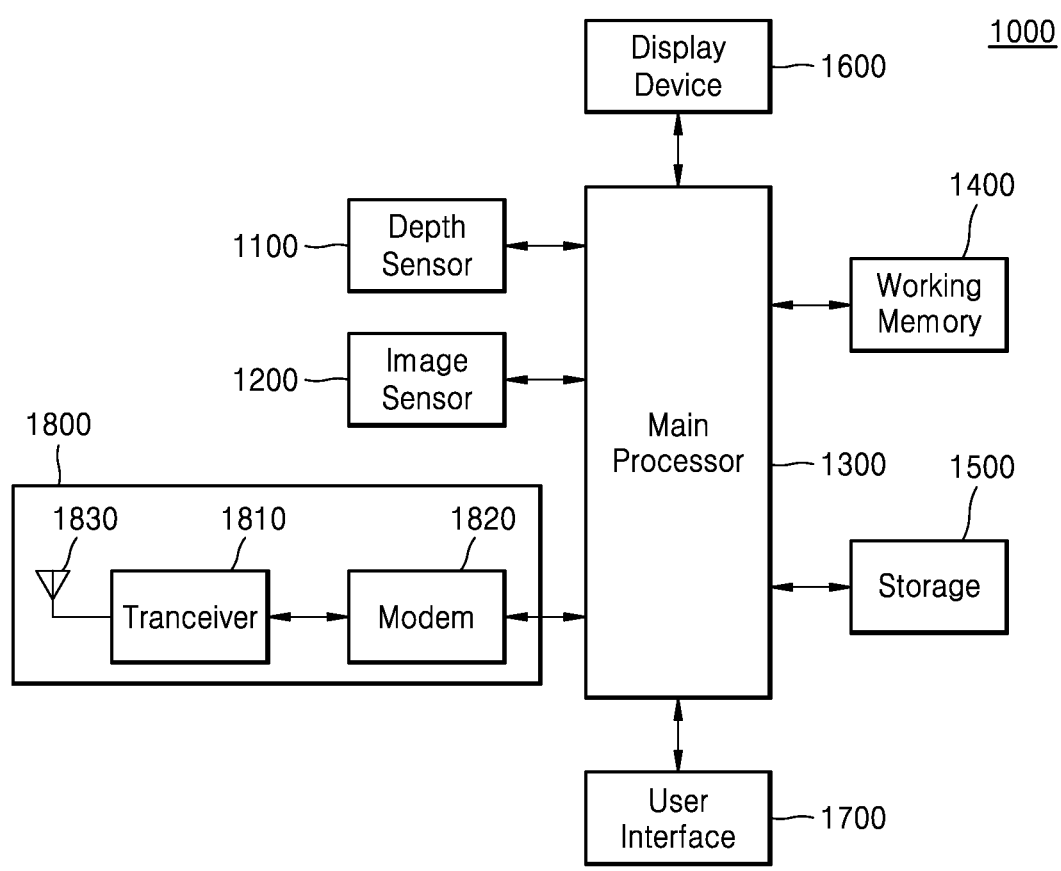
FIG. 17 is a block diagram of an electronic device including a depth sensor, according to an embodiment.

FIG. 17 is a block diagram of an electronic device 1000 including a depth sensor, according to an embodiment.

Referring to FIG. 17, the electronic device 1000 may include a depth sensor 1100, an image sensor 1200, a main processor 1300, a working memory 1400, a storage 1500, a display device 1600, a user interface 1700, and a communication unit 1800.

The depth sensor 1100 may correspond to the depth sensors 100 and 100a described with reference to FIGS. 1 to 16. For example, to measure a distance to an object outside the electronic device 1000, the depth sensor 1100 may generate a pixel signal in response to receiving a reflected signal. The depth sensor 1100 may calculate an intensity of ambient light based on the pixel signal and calculate an ambient light parameter value. The depth sensor 1100 may set a binning mode to be an analog binning mode or a digital binning mode according to the ambient light parameter value. The depth sensor 1100 may generate a digital pixel signal according to a set binning mode and provide the digital pixel signal to the main processor 1300. The main processor 1300 may generate depth data based on the digital pixel signal.

The image sensor 1200 may generate image data, for example, raw image data, based on a received optical signal and provide the image data to the main processor 1300.

The main processor 1300 may control the overall operation of the electronic device 1000, process event data received from the depth sensor 1100, for example, event signals, and detect a movement of an object. Also, the main processor 1300 may receive an image frame from the image sensor 1200 and perform image processing based on preset information.

The working memory 1400 may store data used for the operation of the electronic device 1000. For example, the working memory 1400 may temporarily store packets or frames processed by the main processor 1300. For example, the working memory 1400 may include a volatile memory such as dynamic random access memory (DRAM), synchronous RAM (SRAM), and/or phase-change RAM (PRAM), magneto-resistive RAM (MRAM), resistive RAM (ReRAM), and ferro-electric RAM (FRAM).

The storage 1500 may store data requested to be stored, from the main processor 1300 or other components. The storage 1500 may include a nonvolatile memory such as flash memory, PRAM, MRAM, ReRAM, and FRAM.

The display device 1600 may include a display panel, a display driving circuit, and a display serial interface (DSI). For example, the display panel may be implemented using various devices such as a liquid crystal display (LCD) device, a light emitting diode (LED) display device, an organic LED (OLED) display device, an active matrix OLED (AMOLED) display device, and the like. The display driving circuit may include a timing controller, a source driver, etc. necessary for driving the display panel. A DSI host embedded in the main processor 1300 may perform serial communication with the display panel through a DSI.

The user interface 1700 may include a keyboard, a mouse, a keypad, a button, a touch panel, a touch screen, a touch pad, a touch ball, a gyroscope sensor, a vibration sensor, an acceleration sensor, and/or other modes of input.

The communication unit 1800 may exchange signals with an external device/system through an antenna 1830. A transceiver 1810 and a Modulator/Demodulator (MODEM) 1820 of the communication unit 1800 may process a signal exchanged with an external device/system according to a wireless communication protocol such as Long Term Evolution (LTE), Worldwide Interoperability for Microwave Access (WIMAX), Global System for Mobile communication (GSM), Code Division Multiple Access (CDMA), Bluetooth, Near Field Communication (NFC), Wireless Fidelity (Wi-Fi), Radio Frequency Identification (RFID), etc.

Components of the electronic device 1000, for example, the depth sensor 1100, the image sensor 1200, the main processor 1300, the working memory 1400, the storage 1500, the display device 1600, the user interface 1700, and the communication unit 1800 may exchange data according to various interface protocols such as Universal Serial Bus (USB), Small Computer System Interface (SCSI), Mobile Industry Processor Interface (MIPI), Inter-Integrated Circuit ($I^2C$), Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), Universal Flash Storage (UFS), etc.

While the inventive concept has been particularly shown and described with reference to embodiments thereof, it will be understood that various changes in form and details may be made therein without departing from the spirit and scope of the following claims.

What is claimed is:

1. A method of operating a depth sensor for measuring a distance to an object, the method comprising:
   outputting a pixel signal from at least one depth pixel included in a pixel array;
   obtaining a first intensity from the pixel signal, wherein the first intensity is an intensity of ambient light outside the depth sensor;
   transmitting an incident signal to the object with a second intensity;
   computing an ambient light parameter value, wherein the ambient light parameter value comprises a ratio of the second intensity to the first intensity; and
   setting a binning mode of the depth sensor to an analog binning mode or a digital binning mode based on the ambient light parameter value.

2. The method of claim 1, further comprising:
   outputting, according to the set binning mode, a pixel group signal from a depth pixel group including a plurality of depth pixels; and
   generating a digital pixel signal by processing the pixel group signal according to the set binning mode.

3. The method of claim 2, wherein the generating of the digital pixel signal comprises:
   when the binning mode is set to the analog binning mode, summing a first pixel group signal and a second pixel group signal together to form a combined analog signal; and
   converting the combined analog signal into the digital pixel signal.

4. The method of claim 2, wherein the generating of the digital pixel signal comprises:
   when the binning mode is set to the digital binning mode, converting each of first and second pixel group signals into a digital signal;
   summing each digital signal to form a combined digital signal; and
   generating the digital pixel signal from the combined digital signal.

5. The method of claim 1,
   wherein the setting to the analog binning mode of the digital binning mode comprises:
   when the ambient light parameter value exceeds a threshold, setting the binning mode to the analog binning mode, and
   when the ambient light parameter value is equal to or less than the threshold, setting the binning mode to the digital binning mode.

6. The method of claim 5, wherein the depth sensor determines an operating environment of the depth sensor to be indoors when the ambient light parameter value exceeds the threshold, and
    wherein the depth sensor determines an operating environment of the depth sensor to be outdoors when the ambient light parameter value is equal to or less than the threshold.

7. The method of claim 1, wherein the pixel array comprises a first depth pixel having a 4-tap structure, and
    wherein the outputting of the pixel signal comprises outputting, from the first depth pixel, first to fourth pixel signals from first to fourth signals respectively having first to fourth phases.

8. The method of claim 7, wherein the first to fourth phases are 0°, 90°, 180°, and 270°, respectively.

9. The method of claim 7, wherein the obtaining of the first intensity comprises calculating an average value of the first to fourth pixel signals.

10. The method of claim 1, wherein the depth sensor transmits an incident signal to the object, receives a reflected signal reflected by the object, and measures the distance to the object based on the incident signal and the reflected signal, and
    wherein obtaining of the first intensity comprises generating the first intensity based on an intensity of the incident signal and the intensity of ambient light.

11. The method of claim 1, wherein the first intensity comprises an ambient light parameter value calculated from an incident signal transmitted by the depth sensor and from intensity of the ambient light, and
    wherein the setting to the analog binning mode of the digital binning mode comprises:
    while the ambient light parameter value is equal to or less than a first threshold and exceeds a second threshold at a first time, and when the ambient light parameter value increases to the first threshold at a second time, setting to the analog binning mode; and
    while the ambient light parameter value is equal to or less than the first threshold and exceeds the second threshold at the first time, and when the ambient light parameter value is reduced to the second threshold or less at the second time, setting to the digital binning mode,
    wherein the second threshold is less than the first threshold.

12. A depth sensor comprising:
    a transmitter configured to transmit an incident signal to an object to measure a distance to the object; and
    a receiver configured to receive a reflected signal reflected by the object, wherein the receiver comprises:
        a pixel array comprising a plurality of depth pixels configured to generate a pixel signal from the reflected signal;
        a read circuit configured to receive the pixel signal generated in the pixel array; and
        a controller comprising a parameter calculation circuit configured to calculate an ambient light parameter value, and to set an analog binning mode or a digital binning mode of the read circuit based on an intensity of ambient light,
        wherein the pixel signal is of a first intensity,
        wherein the incident signal is of a second intensity,
        wherein the parameter calculation circuit is configured to calculate the ambient light parameter value by computing a ratio of the second intensity to the first intensity, and
        wherein the read circuit operates in the analog binning mode or the digital binning mode to generate a digital pixel signal based on the ambient light parameter value.

13. The depth sensor of claim 12, wherein the controller comprises:
    a binning mode determination circuit configured to determine a binning mode of the read circuit, wherein, when the ambient light parameter value exceeds a threshold, a binning mode of the read circuit is set to be the analog binning mode, and when the ambient light parameter value is equal to or less than the threshold, the binning mode of the read circuit is set to be the digital binning mode.

14. The depth sensor of claim 13, wherein the ambient light parameter value comprises a variable that may be used to correct a calculated the distance to the object based on the intensity of the ambient light.

15. The depth sensor of claim 13, wherein, with respect to a first threshold and a second threshold, which is less than the first threshold,
    when the ambient light parameter value exceeds the first threshold, the binning mode determination circuit determines the binning mode to be the analog binning mode, and
    when the ambient light parameter value is equal to or less than the second threshold, the binning mode determination circuit determines the binning mode of the read circuit to be the digital binning mode.

16. The depth sensor of claim 15, wherein, while the ambient light parameter value exceeds the second threshold and is equal to or less than the first threshold at a first time, and when the ambient light parameter value increases to the first threshold at a second time, the binning mode determination circuit determines the binning mode of the read circuit to be the analog binning mode, and
    while the ambient light parameter value exceeds the second threshold and is equal to or less than the first threshold at the first time, when the ambient light parameter value is reduced to the second threshold or less at the second time, the binning mode determination circuit determines the binning mode of the read circuit to be the digital binning mode.

17. A depth sensor for measuring a distance to an object, the depth sensor comprising:
    a controller configured to:
        calculate an intensity of ambient light based on a pixel signal generated with respect to a reflected signal reflected by the object;
        determine whether an operation environment of the depth sensor is indoors or outdoors based on the intensity of the ambient light; and
        perform analog binning when the determined operation environment is indoors, and perform digital binning on the pixel signal when the determined operation environment is outdoors,
        wherein the determination of the operation environment comprises: obtaining a first intensity from the pixel signal, obtaining a second intensity from a transmitted incident signal, and computing an ambient light parameter value, wherein the ambient light parameter value comprises a ratio of the second intensity to the first intensity, and wherein the operation environment is determined to be indoors when the ambient light parameter value is above a threshold.

18. The depth sensor of claim 17, wherein the controller is further configured to determine the operation environment of the depth sensor to be outdoors when the intensity of the ambient light is equal to or less than a threshold, and responsive to the determination, configured to control a read circuit to perform digital binning on the pixel signal.

* * * * *